US012338503B2

(12) United States Patent
Kiss et al.

(10) Patent No.: US 12,338,503 B2
(45) Date of Patent: Jun. 24, 2025

(54) KILN FURNITURE KITS AND PARTS OF KITS FOR DEFORMATION AND BREAKAGE FREE HIGH TEMPERATURE TREATMENT OF PRODUCTS, AND USE THEREOF

(71) Applicant: IMERTECH SAS, Paris (FR)

(72) Inventors: Sándor Kiss, Hódmezovásárhely (HU); Luc Bourgy, Isle (FR); Manuel Bourdely, Limoges (FR); Ferenc Konkoly, Hódmezovásárhely (HU)

(73) Assignee: ImerTech SAS, Paris (FR)

( * ) Notice: Subject to any disclaimer, the term of this patent is extended or adjusted under 35 U.S.C. 154(b) by 392 days.

(21) Appl. No.: 17/786,751

(22) PCT Filed: Dec. 15, 2020

(86) PCT No.: PCT/EP2020/086108

§ 371 (c)(1),
(2) Date: Jun. 17, 2022

(87) PCT Pub. No.: WO2021/122518

PCT Pub. Date: Jun. 24, 2021

(65) Prior Publication Data

US 2023/0026542 A1 Jan. 26, 2023

(30) Foreign Application Priority Data

Dec. 17, 2019 (EP) .................................... 19306660

(51) Int. Cl.
*F27D 3/12* (2006.01)
*C21D 9/00* (2006.01)
(Continued)

(52) U.S. Cl.
CPC ......... *C21D 9/0025* (2013.01); *F27D 3/0022* (2013.01); *F27D 5/0006* (2013.01); *F27D 5/0031* (2013.01)

(58) Field of Classification Search
CPC .... C03B 2225/02; F27B 9/2469; F27D 3/026; F27D 3/12; F27D 2003/124;
(Continued)

(56) References Cited

U.S. PATENT DOCUMENTS 3,904,352 A * 9/1975 Thurnauer ............ F27B 9/2469 432/5
4,177,035 A * 12/1979 Buschermohle .......... F27B 9/26 432/239
(Continued)

FOREIGN PATENT DOCUMENTS

CN 107764069 A 3/2018
CN 107764069 B * 11/2018 ........... C04B 35/573
(Continued)

OTHER PUBLICATIONS

International Search Report and Written Opinion mailed Jan. 21, 2021, in International Application No. PCT/EP2020/086108.

*Primary Examiner* — Gregory A Wilson
(74) *Attorney, Agent, or Firm* — Finnegan, Henderson, Farabow, Garrett & Dunner, LLP

(57) ABSTRACT

The present invention relates to kiln furniture kits for supporting ceramic products, such as for example sanitary ware, during high temperature processes in a kiln. The invention further relates to rolling element holders as part of the kiln furniture kits according to the present invention for deformation and breakage free firing or drying of ceramic products.

16 Claims, 4 Drawing Sheets

Figure 1:
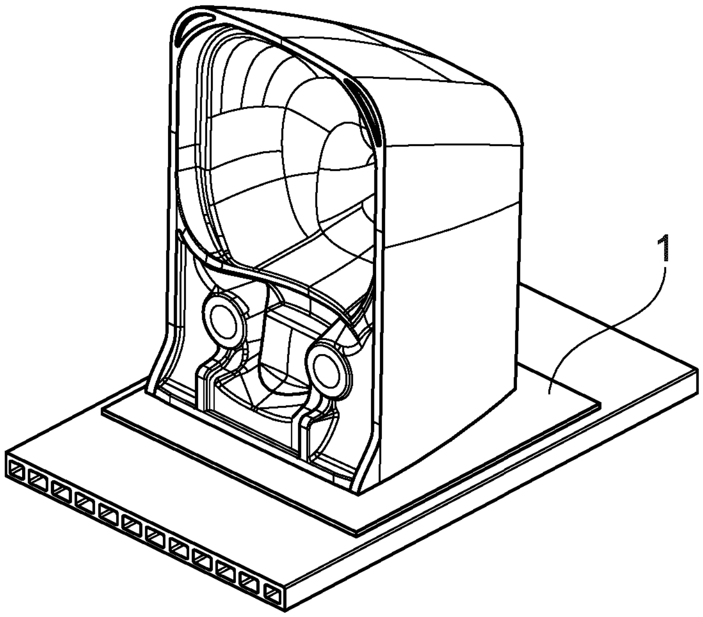

(51) Int. Cl.
*F27D 3/00* (2006.01)
*F27D 5/00* (2006.01)

(58) Field of Classification Search
CPC ............ F27D 2003/0045; C21D 9/563; C21D 9/5737; C21D 9/0012; C21D 9/38; C23C 2/00344; F16C 35/02; F16C 43/02; F27M 2001/1517
See application file for complete search history.

(56) References Cited

U.S. PATENT DOCUMENTS

| | | | | | |
|---|---|---|---|---|---|
| 4,243,378 | A * | 1/1981 | Chronberg | ............ | F27B 9/2469<br>432/239 |
| 4,526,537 | A | 7/1985 | Rumbach | | |
| 4,858,293 | A * | 8/1989 | Rosenzweig | ......... | F16C 29/045<br>29/898.063 |
| 2018/0207724 | A1* | 7/2018 | Broadley | .................. | B22F 3/20 |
| 2023/0026542 | A1* | 1/2023 | Kiss | ...................... | F27D 5/0006 |

FOREIGN PATENT DOCUMENTS

| | | | | | |
|---|---|---|---|---|---|
| CN | 109607035 | A * | 4/2019 | ............. | B65G 13/00 |
| CN | 110108130 | A * | 8/2019 | | |
| EP | 1734323 | A2 | 12/2006 | | |
| JP | 4173017 | B2 | 8/2008 | | |

* cited by examiner

KILN FURNITURE KITS AND PARTS OF KITS FOR DEFORMATION AND BREAKAGE FREE HIGH TEMPERATURE TREATMENT OF PRODUCTS, AND USE THEREOF

CLAIM FOR PRIORITY

This application is a U.S. national phase entry under 35 U.S.C. § 371 from PCT International Application No. PCT/EP2020/086108, filed Dec. 15, 2020, which claims the benefit of priority of European Patent Application No. 19306660.2, filed Dec. 17, 2019, from both of which this application claims priority and both of which are incorporated herein by reference.

FIELD OF THE INVENTION

The present invention relates to kiln furniture kits for supporting ceramic products, such as for example sanitary ware, during high temperature processes in a kiln. The invention further relates to rolling element holders as part of the kiln furniture kits according to the present invention. Finally, the invention also relates to the use of the kits and rolling element holders of the invention for deformation and breakage free firing or drying of ceramic products.

BACKGROUND OF THE INVENTION

In the production of shaped ceramic products, ceramic product precursors, called green ceramic products, are submitted to a firing operation in a firing kiln at temperatures in the range of 900° C. to 1400° C. In preparation of the firing process, a kiln furniture kit is assembled to support the green ceramic product to be fired. The green ceramic product is placed on a kiln furniture and fired in a kiln. In case the green ceramic product exhibits high shrinkage during the firing process, it will contract on the supporting kiln furniture. The sliding of the ceramic product on the support can cause irregular deformations and-or breakage at the surface contacting the kiln furniture, thus resulting in a low quality ceramic product or, in the worst case, in a rejected product.

The state of the art deals with this problem by using a kiln furniture support batt that is itself an intermediate thin green batt or at least a partially fired batt supporting the green ceramic product. During the firing process the batt of the kiln furniture and the green ceramic product are allowed to shrink together to prevent the green ceramic product sliding on the batt of the kiln furniture.

An alternative is provided in WO 2009/156138 A1, which discloses a pre-fired base that is placed under ceramic articles. During firing at high temperatures the base undergoes a predetermined shrinkage suitable for avoiding deformation or breakage of the ceramic articles that are placed on the base. A disadvantage is that the bases may be used only once and are disposed as ceramic production waste after firing.

The same disadvantage exists for the intermediate green batts that shrink together with the ceramic product to be fired. The batts can only be used once and must be thrown away after firing. The production, preparation, set up and the recycling of the shrinking batts is expensive and time consuming increasing the production cost. A further disadvantage may constitute in a lower strength of intermediate green batts.

WO 2013/167477 A1 discloses ceramic compositions for kiln furniture on the basis of compositions comprising cordierite and mullite. Furthermore, a method of producing such ceramics as well as furniture items for a kiln on the basis of such ceramic compositions is disclosed. This does not however consider the problem of shrinkage of ceramic products during firing.

WO 2018/086640 A1 provides specific materials for use in pressed unfired base batts for the firing processes of ceramic products. These need to be made of specific ceramic mixtures, and may only be used once, since they must be disposed of after use.

The state of the art therefore constitutes a problem.

SHORT DESCRIPTION OF THE INVENTION

The above mentioned problems are solved by the invention according to the appended claims. In particular, the problem is solved by a rolling element holder and kiln furniture kits that offer a re-usable alternative solution for kiln furniture elements. Each kiln furniture kit and its elements may be used over several hundred ceramic product high temperature treatment cycles, such as firing and drying.

In one embodiment of the present invention a rolling element holder is provided, which comprises a sheet-like base element and which is configured to hold one or more rolling elements inside perforations or wells within the sheet-like base element. The rolling element holders of the present invention make it possible that a ceramic product to be treated may shrink or move during the high temperature treatment process, such as firing or drying, without causing damage to itself, the supporting kiln furniture or other elements present inside the kiln.

According to the present invention, the holder may comprise suitable ceramic materials, selected from the group consisting of standard silicate, alumina, silico-aluminate and carbide. For example, these materials may be selected from cordierite mullite, light cordierite mullite, or SiC, such as for example infiltrated silicon carbide, recrystallized silicon carbide or nitride bound silicon carbide, or mixtures thereof. These materials were found to be particularly suitable for use in kiln furniture during firing or drying.

In one embodiment of the present invention the perforations or wells may be arranged on the sheet-like base element in a regular pattern. A regular pattern allows the weight of the ceramic product to be fired to be evenly distributed on the kiln furniture. In addition, a regular pattern may increase the ease of design and production of the rolling element holders.

Perforations or wells of the rolling element holder may have any desired shape. In one embodiment of the present invention, the perforations or wells of the rolling element holder may have round or rectangular cross-sections. Perforations or wells having a round cross-section may be particularly suitable to hold balls in the perforations or wells that allow the ceramic product to move in case of shrinkage. Perforations or wells having a rectangular cross-section may be particularly suitable for rollers that allow the ceramic product to move in case of shrinkage.

In a further embodiment of the present invention, a kiln furniture kit may be provided, which comprises one or more rolling element holders, one or more rolling elements, and one or more spacers configured to disintegrate or shrink during a high temperature process. The kit according to this embodiment may optionally further comprise a base batt and/or one or more supporting segments. The kiln furniture kits of the present invention make it possible, in their assembled state, that a ceramic product to be fired may shrink or move during the firing or drying process without causing damage to itself, the supporting kiln furniture or other elements present inside the kiln.

According to one specific embodiment of the present invention, the kiln furniture kit comprises one or more rolling element holders with perforations configured to hold one or more rolling elements, one or more rolling elements, one or more spacers, a base batt, and one or more supporting segments. According to this specific embodiment, in an assembled state, the rolling elements are configured to be placed on the base batt, and the rolling element holder is configured to be placed over the base batt and the rolling elements, such that the rolling elements are arranged inside the perforations of the rolling element holder. Furthermore, the one or more supporting segments are configured to be placed over the rolling elements and rolling element holder, such that they rest on the rolling elements. One or more spacers may be arranged between the other elements of the kit in such a way as to maintain all elements in place prior to a firing or drying process.

According to a further specific embodiment of the present invention, the kiln furniture kit comprises one or more rolling element holders with wells configured to hold one or more rolling elements, and further comprises one or more rolling elements, one or more spacers, and one or more supporting segments. According to this specific embodiment, the rolling element holder forms an integral part with a base that may be placed inside a kiln. According to this specific embodiment, in an assembled state, the rolling elements are configured to be placed inside the wells of the rolling element holder. Furthermore, the one or more supporting segments are configured to be placed over the rolling elements and rolling element holder, such that they rest on the rolling elements. One or more spacers may be arranged between the other elements of the kit in such a way as to maintain all elements in place prior to a firing or drying process.

According to a further specific embodiment of the present invention, the kiln furniture kit comprises one or more rolling element holders with wells configured to hold one or more rolling elements, and further comprises one or more rolling elements, one or more spacers, and a base batt. According to this specific embodiment, in an assembled state, the rolling elements are configured to be placed on the base batt, and the rolling element holder is configured to be placed over the base batt and the rolling elements, such that the rolling elements are arranged inside the wells of the rolling element holder. According to this specific embodiment, the rolling element holder further acts as a supporting element for products to be fired in a kiln. One or more spacers may be arranged between the other elements of the kit in such a way as to maintain all elements in place prior to a firing or drying process.

In an embodiment according to the present invention, the rolling elements may be selected from balls or rollers. The use of balls allows the elements of the assembled kit to follow any movement caused by shrinking of the product to be fired, in any direction caused by such shrinkage. The use of rollers, such as for example cylindrical rollers, on the other hand, allows the elements of the assembled kit to follow movement caused by shrinking of the product to be fired, in specific directions dictated by the orientation of the rollers, and caused by such shrinkage, which direction may be foreseen prior to firing or drying.

The rolling elements may comprise suitable ceramic materials selected from standard silicate, alumina, silico-aluminate, carbides, nitrides, zirconia, or silicon carbide. For example, the rolling elements may comprise dense cordierite, high alumina, doped zirconia, or SiC, silicon infiltrated silicon carbide, recrystallised silicon carbide or nitride bound silicon carbide, and mixtures thereof. It was found that it is advantageous that the rolling elements are particularly hard, in order to bear the weight of the products to be fired.

In an embodiment according to the present invention one or more spacers may be used in the preparation of the high temperature process. The spacers may be configured to hold the other elements of the kiln furniture kit in place during loading of the green ceramic product onto the assembled kit. The spacers may be configured to allow the elements of the kit to freely move during firing or drying by for example disintegration or shrinkage. Depending on the materials used, the spacers may either burn without substantial residue or shrink in such way that free movement of the elements of the kit is ensured.

In an embodiment according to present invention a base batt may comprise suitable ceramic materials selected from the group consisting of standard silicate, alumina, silico-aluminate and carbide. For example, these materials may be selected from cordierite mullite, light cordierite mullite, or SiC, such as for example infiltrated silicon carbide, recrystallized silicon carbide or nitride bound silicon carbide, or mixtures thereof. These materials were found to be particularly suitable for use in kiln furniture during firing or drying.

In an embodiment according to the present invention, the one or more supporting segments present in the kit may be coated by a material comprising alumina, silico-aluminate, silica, magnesia, or mixtures thereof such as for example high alumina, quartz, magnesite or any mixtures thereof. This coating or engobe avoids the problem that the one or more supporting segments and the ceramic product stick to each other, and the coating or engobe accordingly facilitates sliding of the product on the supporting segments during high temperature processes in the kiln, such as firing or drying. Similarly, in the case where no supporting segment is present in the kit, and the rolling element holder further acts as a supporting element, the said rolling element holder on its supporting surface may be coated by a material comprising alumina, silico-aluminate, silica, magnesia, or mixtures thereof such as for example high alumina, quartz, magnesite or any mixtures thereof.

In an embodiment according to the present invention the base batt may further comprise limiting elements on its edges, such as for example limiting elements selected from a rim, pins, nibs or a mixture of nibs and pins. The said limiting elements may be made of the same material as the base batt.

According to the present invention, the kiln furniture kit may be used for the firing or drying of sanitary ware products.

Also part of the present invention is the use of a rolling element holder or a kiln furniture kit according to the invention in the high temperature treatment of ceramic products, such as firing or drying. The use of the rolling element holder or the kiln furniture kit according to the invention allows for the firing or drying of ceramic products without the danger of damage caused to either the ceramic product to be fired, the kiln furniture elements, or any other products or kiln furniture in the kiln. According to one aspect of the invention, the ceramic products to be fired or dried may be sanitary ware products and/or high shrinkage ceramic products.

According to one embodiment of the present invention, during the use of a kiln furniture kit comprising perforations and/or wells, not all such perforations and/or wells may be used for rolling elements. The reduction of the number of rolling elements during use may represent a method to reduce the overall weight of the kiln furniture kit, increase air circulation around the product, thereby increasing speed and ease of use for the firing or drying of light weight ceramic products, and also reducing the need for thermal energy invested during firing or drying. In a further embodiment of the present invention all perforations and/or wells in the rolling element holder may be used by rolling elements, in case of heavy ceramic products to be fired.

The use of a plurality of kiln furniture kits supporting one ceramic product is also part of the present invention, in case of heavy ceramic products to be fired.

SHORT DESCRIPTION OF THE FIGURES

Figure 2:
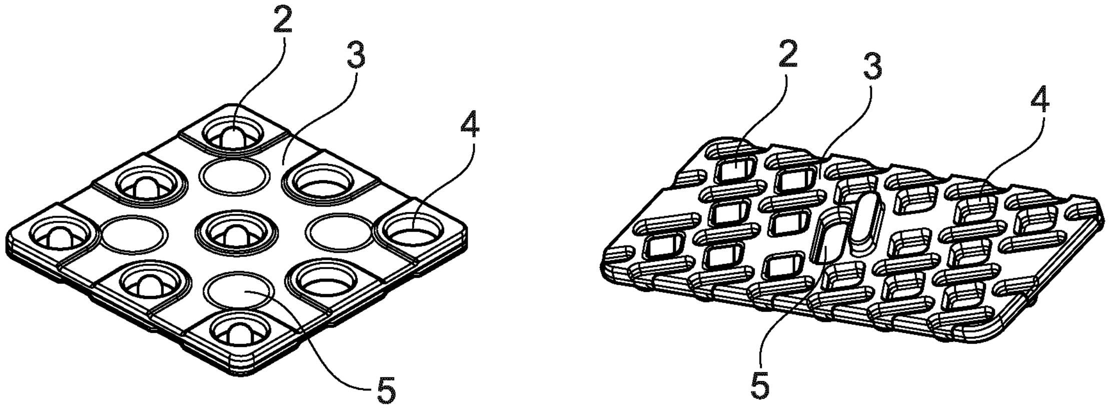
Figure 3:
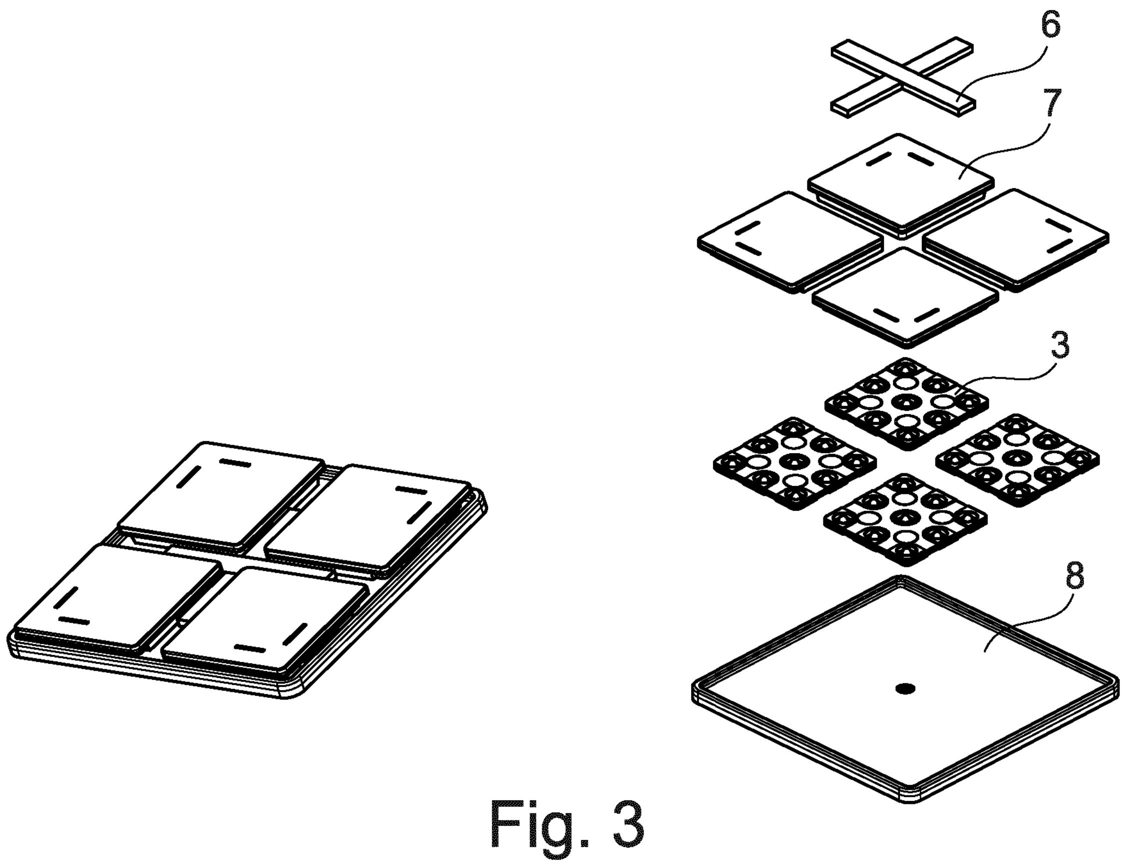
Figure 4:
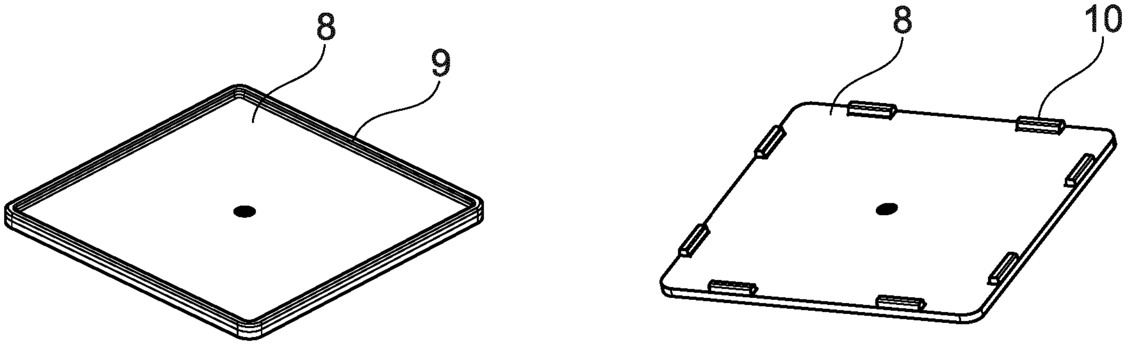
Figure 5:
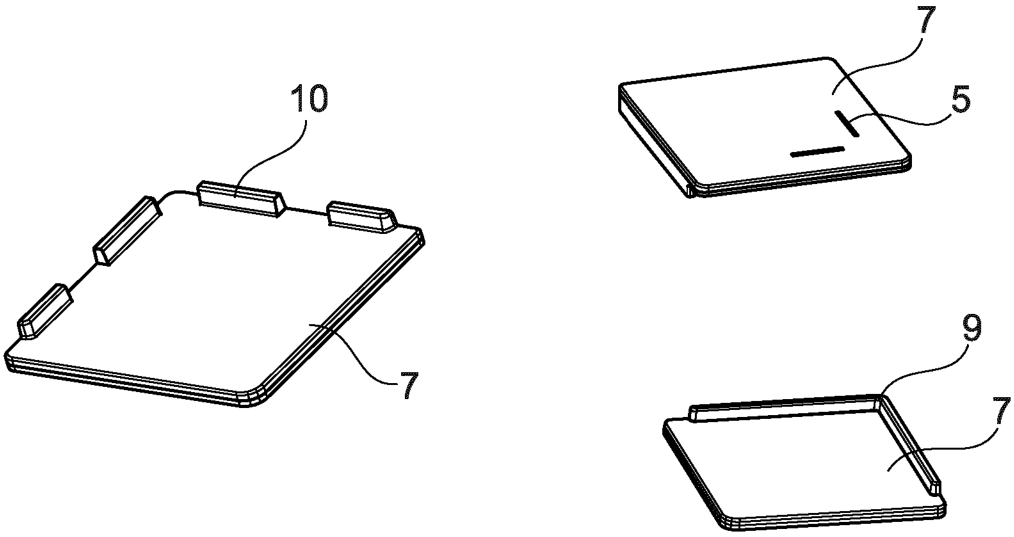

The invention will be further illustrated by reference to the following figures:

FIG. 1 shows a sanitary ware product placed on a single-use shrinkage base as presented in the state of the art;

FIG. 2 shows a rolling element holder 3 with rolling elements 2 inside of perforations 4 and comprises perforations 4 and recesses 5 that are not used for rolling elements decreasing the weight of the rolling element holder;

FIG. 3 shows on the left side a kiln furniture kit in its assembled state, and on the right side the parts of the same kiln furniture kit, comprising a base batt 8, a rolling element holder 3 containing balls as rolling elements inside perforations 4, supporting segments 7 and spacers 6;

FIG. 4 shows two base batts comprising two different types of limiters, on the left side a continuous rim 9 may stop the movement of the rolling element holder 3 or the rolling elements; on the right side a base batt 8 with nibs 10 is presented as an alternative;

FIG. 5 shows supporting segments 7 having limiting elements which are configured to stop the movement of the shrinking ceramic product through a rim 9 or nibs 10; a supporting segment may contain recesses and/or perforations 5 to decrease the weight of the supporting segment.

Figure 6:
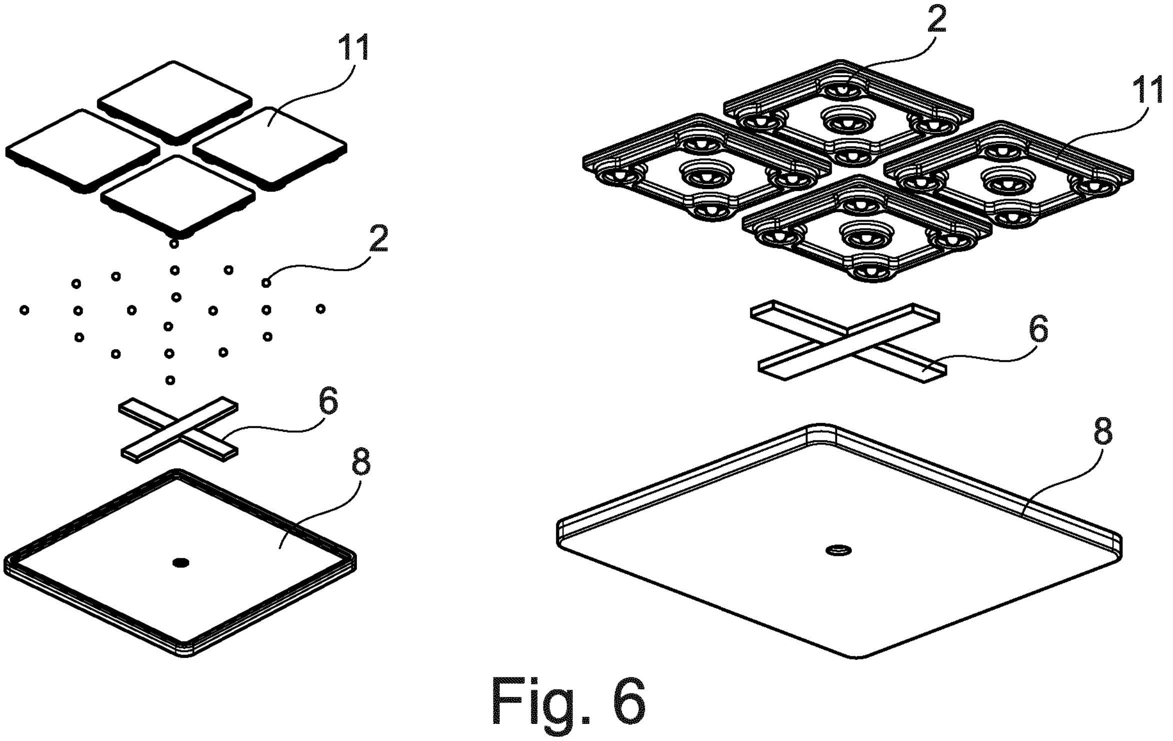
Figure 7:
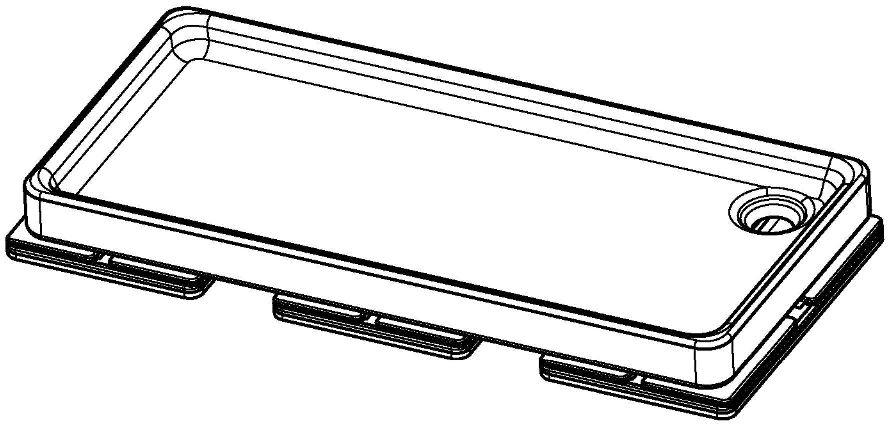

FIG. 6 shows a rolling element holder acting as a supporting element 11 that may be used when the shrinkage of the ceramic product is relatively small during high temperature treatment; the rolling element holder acting as a supporting element 11 is placed over a base batt 8 and rolling elements 2 which ensure the movement during shrinkage, while spacers 6 may keep the kiln furniture elements in place during loading of the product;

FIG. 7 shows an example of a large sanitary ware piece which requires the use of a plurality of kiln furniture elements to allow movement during the high temperature process.

DETAILED DESCRIPTION OF THE INVENTION

The present invention according to the appended claims provides a rolling element holder 3 and kiln furniture kits for supporting ceramic products during high temperature treatment, such as firing or drying, and their use. The ceramic products to be fired may be sanitary ware.

The present invention provides kiln furniture kits which may comprise a rolling element holder as part of a kiln furniture kit to provide deformation free firing or drying of shaped ceramic products as an improvement over the state of the art. FIG. 1 illustrates a shrinking base 1 with a ceramic product placed onto the base according to the state of the art. The ceramic product will shrink together with the shrinking base during firing or drying avoiding deformation of the ceramic product. The shrinking base is not re-usable and is disposed as ceramic waste after firing or drying.

A rolling element holder may be part of a kiln furniture kit for use in high temperature treatment of ceramic products. The rolling element holder 3, as shown on the left side of FIG. 2, comprises a sheet-like base element and may be part of a kiln furniture kit. The rolling element holder 3, as shown in FIG. 2, is configured to hold one or more rolling elements 2, such as for example balls, inside of perforations 4 having round cross-sections. The rolling element holder 3 thereby having a smaller height than said rolling elements 2 which may carry supporting segments on which the ceramic products to be fired are placed. Undergoing shrinkage during the firing or drying process, the ceramic product may move on the supporting segment. This movement is supported by balls which may also move together with the ceramic product. The rolling element holder may be pushed as a consequence by the rolling elements in the direction of shrinkage avoiding deformation or breakage of the ceramic product. The rolling element holder, as shown in FIG. 2, may also comprise unused perforations and/or wells 4 or perforations and/or recesses 5 to decrease the weight of the rolling element holder 3 and/or facilitate air circulation.

In a different embodiment, as shown on the right side of FIG. 2, the rolling element holder 3 according to the present invention may also comprise rollers as rolling elements 2. The perforations of the rolling element holder in this case have a substantially rectangular cross-section 4 inside which rollers are placed. The rollers carry then supporting segments on which the ceramic product to be fired is loaded. Undergoing shrinkage, the contracting movement of the ceramic product is supported by the rollers which may move together with the ceramic product in the direction of shrinkage avoiding the deformation of the ceramic product. The rolling element holder, as shown in FIG. 2, may also comprise unused perforations and/or wells 4 or perforations and/or recesses 5 to decrease the weight of the rolling element holder 3 and facilitate air circulation.

In both said embodiments, the rolling element holder 3 may comprise a suitable ceramic material. The material may be selected from the group consisting of standard silicate, alumina based products, silico-aluminate, or carbide, such as for example cordierite mullite, light cordierite mullite, or SiC, such as for example, infiltrated silicon carbide, recrystallized silicon carbide or nitride bound silicon carbide, or mixtures thereof.

In both configurations the rolling element holder ensures that the rolling elements are kept in a certain pattern. The pattern may be regular meaning that one rolling element has substantially the same distance to the neighbouring rolling elements. The pattern may be symmetric. In another embodiment the pattern is such that always a group of two perforations have the same distance, between other groups of two perforations might be a greater or smaller distance. The pattern may also have a different symmetry to ensure optimal support of the weight of the supporting segments carrying the ceramic product to be fired.

The present invention provides kiln furniture kits comprising one or more rolling element holders 3, one or more rolling elements 2, one or more spacers 6 that keep the kit in place during loading of the ceramic article and do not interfere with the movements during the firing or drying process, optionally a base batt 8, and optionally one or more supporting segments.

A specific embodiment of a kiln furniture kit according to the present invention is shown in FIG. 3 and comprises a base batt 8, one or more supporting segments 7, one or more rolling elements 2, one or more rolling element holders 3 and one or more spacers 6. The elements of the kit may move in the direction of shrinkage on the base batt 8. The base batt is shown in more detail in FIG. 4 having limiting elements on its edges selected from the group consisting of rim, nibs, pins or a mixture of pins and nibs, preventing the one or more rolling elements to move over the edges of the base batt 8. The limiting elements may comprise or consist of the same material as the base batt 8. On the base batt 8 one or more rolling element holders 3 may be placed comprising rolling elements 2 in perforations. On the rolling elements 2 one or more supporting segments 7 may be placed carrying ceramic products to be fired. In between the one or more rolling elements spacers 6 may be placed to keep the holders in an initial position. The spacers may comprise a material suitable for the firing or drying process, such as for example Styrofoam. After starting the firing or drying process, a spacer comprising Styrofoam may burn without a residue allowing the supporting elements to move freely in the direction of shrinkage. The kiln furniture kit, as shown in FIG. 3, comprises one or more balls as rolling elements 2 and one or more rolling element holders 3 having perforations with round cross-sections. In another embodiment of the kiln furniture kit, the kit comprises one or more rollers as rolling elements 2 and one or more rolling element holders 3 having perforations with rectangular cross-sections. A rectangular cross-section means two-longer sides are adjacent to two shorter sides. A short side is always connected to two longer sides. The corners may be rounded, but the sides are substantially perpendicular to each other. The one or more rolling element holders 3 and the base batt 8 according to this specific kiln furniture kit may comprise perforations and/or wells to decrease the weight of the kiln furniture kit. During the firing or drying process the ceramic product may shrink due various mechanisms such as the loss of water, mineral dihydroxylation, or densification. To avoid that the contracting movement of the ceramic product may deform or destroy the ceramic product the supporting elements may move together with the contraction movement of the ceramic product avoiding tensions.

Another kiln furniture according to the present invention may comprise an integral part formed by a rolling element holder and a base. This sheet-like base element may comprise wells that may be in a regular or irregular pattern. The wells may be configured to hold one or more rolling elements inside the wells allowing the rolling elements to move in the direction of shrinkage during the firing or drying process. The one or more supporting elements are placed on the rolling elements carrying the ceramic product to be fired. If the ceramic product undergoes shrinkage, the contraction of the ceramic product may move the one or more supporting segments on the one or more rolling elements in the direction of shrinkage. The movement of the one or more rolling elements may be limited by the size of the wells in which the rolling elements are placed.

Another specific kiln furniture kit according to the present invention may comprise a rolling element holder acting as a supporting element 11, as shown in FIG. 6, a base batt 8, one or more rolling elements 2 and one or more spacers 6. The upper side of said rolling element holder acting as a supporting element 11 is configured to carry ceramic products to be fired. The bottom side of said rolling element holder acting as a supporting element 11 may be configured to be placed over one or more rolling elements 2 inside wells. This sheet-like base element may be kept in its initial position by spacers 6 which configured to disintegrate or shrink during the firing or drying process allowing the supporting elements to move freely in the direction of shrinkage. The spacers may comprise a material suitable for the firing or drying process, such as for example Styrofoam which burns without residue. The base batt 8 may have limiting elements on its edges selected from the group consisting of rim 9, nibs 10, pins or a mixture of pins and nibs, preventing the one or more rolling elements to move over the edges of the base batt 1. The limiting elements may comprise or consist of the same material as the base batt 8. The said rolling element holder acting as a supporting element 11 may comprise unused wells that may decrease the weight of the piece.

The rolling elements used in the specific kiln furniture kits may comprise rollers and/or balls comprising a suitable material. A suitable material may be selected from the group consisting of alumina based products, silico-aluminates, carbides, nitrides, zirconia, such as for example dense cordierite, high alumina, doped zirconia, or SiC, such as for example infiltrated silicon carbide, recrystallized silicon carbide or nitride bound silicon carbide, or mixtures thereof.

Spacers may be used to keep the supporting elements of the kiln furniture kits in their respective initial position during loading of the ceramic product to be fired onto the kiln furniture kit in an assembled state. The spacers may disintegrate or shrink allowing the supporting elements to move freely during the firing or drying process.

The base batt 8 may be used in a kiln furniture kit according to the present invention. The base batt may comprise a material selected from the group consisting of standard silicate, alumina, silico-aluminate, carbide such as for example cordierite mullite, light cordierite mullite, high alumina, SiC, silicon infiltrated silicon carbide, recrystallized silicon carbide or nitride bound silicon carbide, or mixtures thereof. The base batt of the kiln furniture may carry the parts of the kiln furniture kit moving in the direction of shrinkage.

In an embodiment according to the present invention a kiln furniture kit may be used for firing or drying sanitary ware and/or high shrinkage ceramic products.

According to the present invention, a kiln furniture can be assembled from any part of the invention according to the requirements of the ceramic product to be fired an industrial kiln.

In case of a heavy ceramic product needs to be fired, it is possible to place the heavy item, such as for example bath tubs or shower trays, on a plurality of kiln furniture kits and use the plurality of kiln furniture kits to support only one ceramic product. Such an assembly is illustrated in FIG. 7, opening up the possibility to fire such heavy high shrinkage ceramic products free of deformation avoiding expensive and unnecessary rejections or low quality ceramic products.

LIST OF REFERENCE NUMERALS

- 1. Shrinking base
- 2. Rolling element
- 3. Rolling element holder
- 4. Unused perforation
- 5. Recess and/or perforation for weight reduction
- 6. Spacer
- 7. Supporting segment
- 8. base batt
- 9. rim
- 10. nibs
- 11. integral part

The invention claimed is:

1. A kiln furniture kit for use in drying and/or firing ceramics products, comprising one or more rolling element holders, one or more rolling elements, one or more spacers configured to burn without residue in a firing and/or drying process, a base batt, and one or more support segments, wherein the one or more rolling element holders comprise perforations configured to hold the one or more rolling elements.

2. The kiln furniture kit according to claim 1, further comprising: a base, wherein the rolling element holder and the base form an integral part.

3. The kiln furniture kit according to claim 1, wherein:

the rolling element holder is configured to support ceramic products to be fired, the rolling element holder comprises one or more wells formed on a lower surface of the rolling element holder, and the one or more wells on the lower surface of the rolling element holder are configured to be placed over one or more rolling elements sitting on the base batt.

4. The kiln furniture kit according to claim 1, wherein the one or more rolling elements are selected from balls or rollers.

5. The kiln furniture kit according to claim 1, wherein the rolling elements comprise a material selected from the group consisting of alumina, silico aluminates, carbides, nitrides, zirconia, and mixtures thereof.

6. A kiln furniture kit according to claim 5, wherein the base batt comprises a material selected from the group consisting of standard silicate, alumina, silico-aluminate, carbide, and mixtures thereof.

7. The kiln furniture kit according to claim 6, wherein the one or more support segments are coated by a material comprising alumina, silico-aluminate, silica, magnesia, or mixtures thereof.

8. The kiln furniture kit according to claim 7, wherein the rolling element holder is configured to support ceramic products to be fired, the rolling element holder comprises one or more wells formed on a lower surface of the rolling element holder, and the one or more wells on the lower surface of the rolling element holder are configured to be placed over one or more rolling elements sitting on the base batt.

9. The kiln furniture kit according to claim 8, wherein the one or more rolling elements are selected from balls or rollers.

10. The kiln furniture kit according to claim 9, wherein the one or more spacers is configured:

to maintain the other elements of the kiln furniture in place prior to a firing and/or drying process, and to disintegrate or shrink during firing and/or drying process to allow the other elements of the kit to freely move.

11. The kiln furniture kit according to claim 1, wherein the one or more spacers is configured:

to maintain the other elements of the kiln furniture in place prior to a firing and/or drying process, and to disintegrate or shrink during firing and/or drying process to allow the other elements of the kit to freely move.

12. The kiln furniture kit according to claim 1, wherein the base batt comprises limiting elements on its edges selected from the group consisting of a rim, pins, nibs, and a mixture of nibs and pins, and wherein the limiting elements comprise the same material as the base batt.

13. A kiln furniture kit according to claim 1, wherein the base batt comprises a material selected from the group consisting of standard silicate, alumina, silico-aluminate, carbide, and mixtures thereof.

14. The kiln furniture kit according to claim 1, wherein the one or more support segments are coated by a material comprising alumina, silico-aluminate, silica, magnesia, or mixtures thereof.

15. The kiln furniture kit according to claim 1, wherein the perforations or wells have a substantially rectangular cross-section.

16. The kiln furniture kit according to claim 15, wherein the substantially rectangular perforations or wells have rounded corners.

* * * * *